(12) United States Patent
Jaeger

(10) Patent No.: US 7,103,851 B1
(45) Date of Patent: Sep. 5, 2006

(54) SCROLL BAR FOR COMPUTER DISPLAY

(76) Inventor: Denny Jaeger, 6120 Valley View Rd., Oakland, CA (US) 94611

( * ) Notice: Subject to any disclaimer, the term of this patent is extended or adjusted under 35 U.S.C. 154(b) by 552 days.

(21) Appl. No.: 10/188,625

(22) Filed: Jul. 1, 2002

Related U.S. Application Data

(63) Continuation-in-part of application No. 09/880,397, filed on Jun. 12, 2001, now Pat. No. 6,883,145, which is a continuation-in-part of application No. 09/785,049, filed on Feb. 15, 2001.

(51) Int. Cl.
*G06F 17/00* (2006.01)

(52) U.S. Cl. .................. 715/786; 715/833; 715/830

(58) Field of Classification Search ........ 715/781–788, 715/827–835
See application file for complete search history.

(56) References Cited

U.S. PATENT DOCUMENTS

| | | | | |
|---|---|---|---|---|
| 5,371,846 A | * | 12/1994 | Bates ........................... | 715/786 |
| 5,586,244 A | * | 12/1996 | Berry et al. ................. | 715/788 |
| 5,745,100 A | * | 4/1998 | Bates et al. .................. | 345/157 |
| 5,903,267 A | * | 5/1999 | Fisher ......................... | 715/786 |
| 5,973,663 A | * | 10/1999 | Bates et al. .................. | 715/786 |
| 6,147,683 A | * | 11/2000 | Martinez et al. ............ | 715/786 |
| 6,538,671 B1 | * | 3/2003 | Hall et al. .................... | 715/781 |
| 6,570,594 B1 | * | 5/2003 | Wagner ........................ | 715/786 |
| 6,738,084 B1 | * | 5/2004 | Kelley et al. ................ | 715/784 |
| 6,803,930 B1 | * | 10/2004 | Simonson .................... | 715/784 |

* cited by examiner

*Primary Examiner*—Tdesse Hailu
(74) *Attorney, Agent, or Firm*—Harris Zimmerman

(57) ABSTRACT

An improved scroll bar arrangement for a window (canvas) displayed on a computer screen includes a computer display canvas comprised of a wire frame and a scroll button (fader cap) at a side edge and/or bottom edge of the canvas. The fader cap is a rectangular box having a transparent center, so that onscreen objects behind the canvas are visualizable therethrough. The fader cap may be dragged along its respective side of the canvas to move the document through the canvas in typical scrolling fashion. The position of the fader cap along its edge is related to a ratio of the position of the portion of the document being displayed, to the total length (or width) of the document. Navigation aids include marker bars and lassoing marker bars to select document portions therebetween.

4 Claims, 5 Drawing Sheets

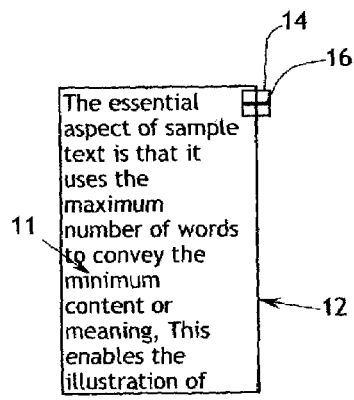

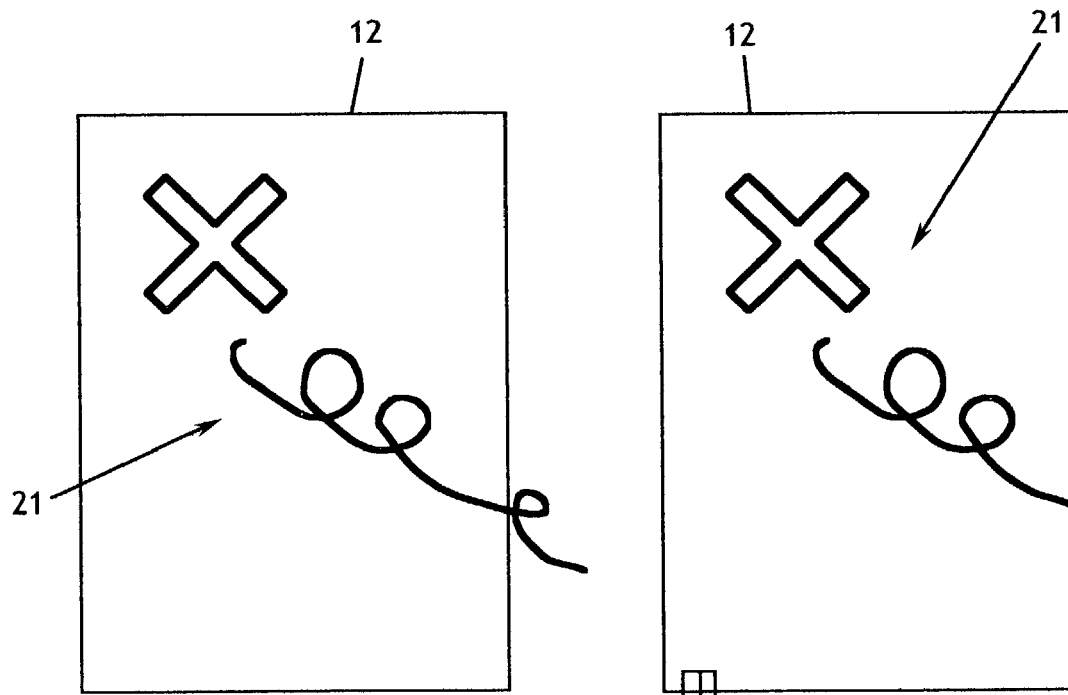
FIG. 7A
FIG. 7B
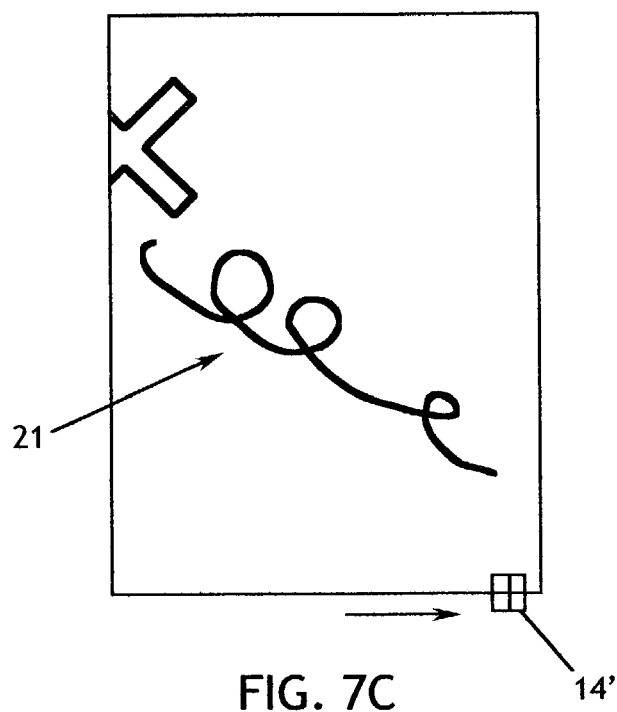
FIG. 7C

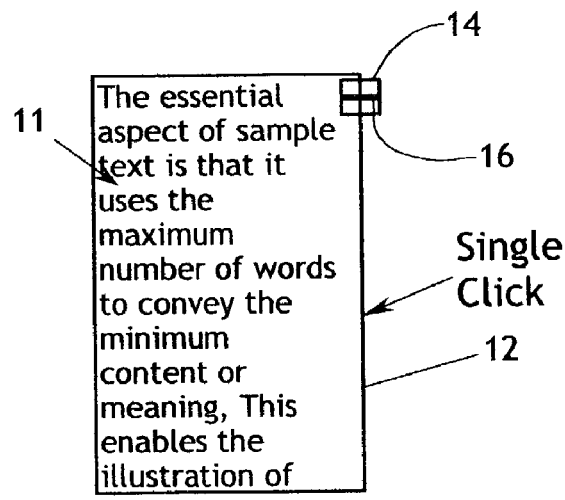
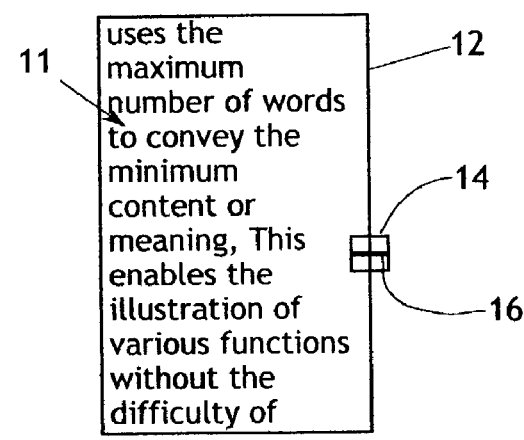
FIG. 8A
FIG. 8B
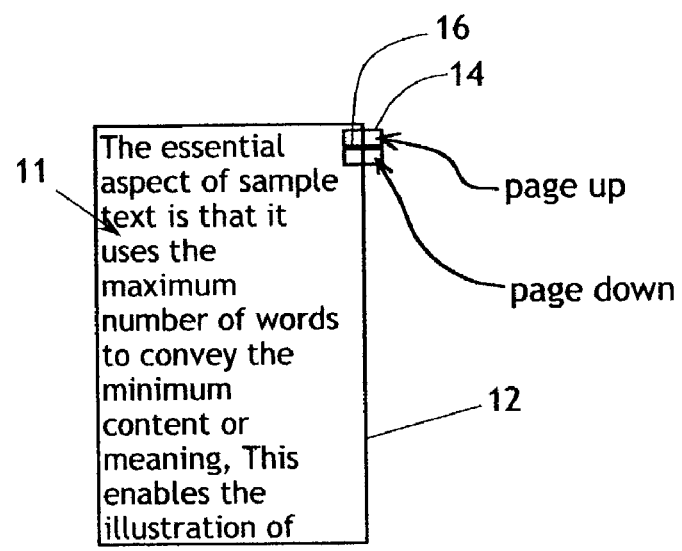
FIG. 9

SCROLL BAR FOR COMPUTER DISPLAY

REFERENCE TO RELATED APPLICATION

This application is a continuation-in-part of U.S. patent application Ser. No. 09/880,397, filed Jun. 12, 2001 now U.S. Pat. No. 6,883,145, which is a continuation-in-part of U.S. patent application Ser. No. 09/785,049, filed Feb. 15, 2001, for which priority is claimed. The entireties of the prior applications are incorporated herein by reference.

BACKGROUND OF THE INVENTION

Given the fact that the graphic user interface for computers and the like has been in use for less than two decades, it is somewhat surprising that so many of the common furnishings of the most popular graphic interfaces have become so familiar. Indeed, features such as pulldown menus and a window for each program or document that is open, are tools that computer users expect to be provided in any consumer or commercial application.

In a general sense, a window displayed in a graphical user interface is a rectangular display space bounded by a border. Typically, the size of the window may be altered by dragging one corner inwardly or outwardly, or clicking on a marquee button that shrinks or expands the window size. When the window display space is smaller than the document or object it is displaying, it is typical for a window to automatically provide a scroll bar. The scroll bar is comprised of a narrow rectangular box extending vertically and/or horizontally at the edge of the window, and a smaller rectangular "button" disposed in the box and adapted to be clicked and dragged longitudinally along the narrow box, in the manner of a slider button constrained in a channel or track. The length of the track represents the entire length (or width) of the thing being displayed, and the position of the button on the track provides an intuitive indication of the portion of the thing that is currently displayed in the window.

Consumer demand has led to the introduction of enhancements to the scroll bar concept. Up and down arrows at one or both ends of each scroll track can be used to scroll incrementally (line-by-line, for example), and a mouse scroll wheel enables rolling/scrolling motion by the user when the mouse cursor is on the track. Also, some applications employ a scaled size scroll button, in which the longitudinal dimension of the button is approximately proportioned to the ratio of the window display length (or width) to the length (or width) of the thing being displayed. These features enable the user to assert precise control of the scrolling process.

Aside from microcontrol of scrolling, another problem presented by scroll bars involves navigation within a document, particularly a large document. For example, a word processing document may have tens or hundreds of pages, and editing such a document may require cutting and pasting throughout the document, style changes or rewriting at designated places, and the like. Marking, finding, and keeping track of locations within a large document are tasks that scroll bar embodiments known in the prior art are not designed to carry out. In some applications, dragging the scroll button causes an adjacent box to display the current page number, so that the user may know how far to drag the button to arrive at a particular page. However, the user must rely on other external organizing tools to be efficient in editing or revising a large document.

As noted above, every scroll bar includes an opaque track on which the scroll button is slidable. Thus each window presented onscreen includes opaque margins at the bottom and sides that are approximately ¼ inch (0.6 cm) wide, obscuring a small but not insubstantial portion of the display. When several windows are presented onscreen simultaneously, the reduction in object display area caused by the sum total area of the scroll bars of the windows may become significant. It is desirable to reduce this waste of display space, if possible.

SUMMARY OF THE INVENTION

The present invention generally comprises an improved scroll bar arrangement for a window displayed on a computer display or the like. Salient aspects of the invention are that it occupies an absolute minimum of onscreen display space, and that it provides a simple arrangement for navigating through a document exhibited in a window.

In order to avoid confusion with previous understandings of the term "window" as it applies to the display arts, and to prevent any misunderstanding regarding trademarks that include the term "window," hereinafter a bounded area within an electronic display space for exhibiting a document or item will be termed a "canvas."

The scroll bar arrangement includes a computer display canvas comprised of a wire frame, rather than the prior art style that includes a wide border at the margin. In addition, a scroll button is provided at a side edge and/or bottom edge of the canvas, the scroll button comprised of a rectangular box having a transparent center, so that onscreen objects behind the canvas are visualizable through the portion of the scroll button that extends outwardly from the canvas edge. The scroll button is constrained to translate along the respective edge of the canvas, in the manner of a fader controller, and hereinafter will be termed a fader cap.

The fader cap may be dragged along its respective side of the canvas to move the document through the canvas in typical scrolling fashion. The dragging technique may comprise any such technique known in the prior art, such as click-and-drag, touch-and-drag on a touch screen, and the like. The position of the fader cap along its edge generally represents the distances of the portion of the document being displayed to the beginning and end of the document.

The invention also provides a navigation aide to assist a user in noting any portion of the document for future access. The fader cap may be provided with a line extending medially through the rectangular box perpendicular to the edge of the canvas. The fader cap may be dragged to any point along its edge of the canvas (or the document may be advanced by other means, such as incremental advances), and the medial line of the fader cap, or any of the area inside the perimeter of the object that makes up the fader cap, may be double clicked (or the like) to cause a marker bar (or line) to be displayed on the edge of the canvas at the position of the medial line of the fader cap. NOTE: the fader cap can be generally any geometric shape that would be appropriate for traveling along the edge of a canvas, i.e., a circle, triangle, sphere, cube, etc. This process may be repeated as many times as necessary along the edge of the canvas (corresponding to differing locations in the document) to generate a plurality of marker bars along the canvas edge.

Each marker bar may be displayed in a unique color, so that it is easily distinguished from the other marker bars. As an alternate the markers could all be the same color with each marker having its own label. The user may right-click (or the like) on any marker bar to call forth an Info Canvas display that exhibits detailed data on that particular marker bar. The Info Canvas may include a space for notes entered by the user, so that the portion of the document displayed at that particular marker bar may be identified, and comments may be entered. In addition, the color, assignment, dates of creation and modification, and the like may be recorded. This data is important in enabling the user to edit documents and navigate between different sections of text, portions of a picture file, spreadsheet rows and columns, and the like.

A further aspect of the invention is the ability to select text using the marker bars. A user may lasso or otherwise circumscribe any two marker bars to cause the system to select all of the document that lies between the two markers. Thus, for example, the use may lasso two marker bars to select several pages of text, and then change the font size or style for that selected portion of the document. Likewise, in a spreadsheet display a user may employ lassoed marker bars to select rows and columns of the spreadsheet.

BRIEF DESCRIPTION OF THE DRAWING

FIG. 1 is a sample text portion used in subsequent figures.

FIG. 2 is a plan view of the canvas and scroll bar arrangement of the present invention, displaying the sample text of FIG. 1.

FIG. 3 is a plan view of the canvas of FIG. 2, showing the fader cap moved to the bottom of the document.

FIGS. 4A–4D depict the steps in placing marker bars along the scroll edge of the canvas.

FIGS. 7A–7C depict a plan view of a picture exhibited in a wire frame canvas, and horizontal scrolling to view the entire picture.

FIGS. 8A–8B depict a plan view of a canvas and scroll bar arrangement displaying a text portion, showing techniques for navigation using the scroll cap.

FIG. 9 depicts a plan view of a canvas and scroll cap, showing one technique for page up/down navigation.

DESCRIPTION OF THE PREFERRED EMBODIMENT

Figure 5:
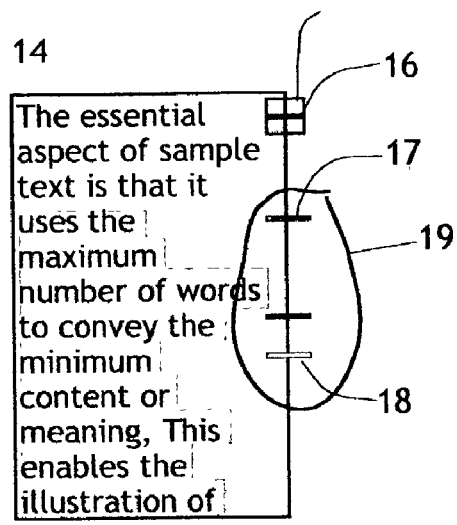
FIG. 5 is a plan view of a selection technique involving drawing a lasso about two marker bars.

The present invention generally comprises an improved canvas display and scrolling feature for use in a computer display or similar visualized output from any electronic device, from mobile telephones to microwave ovens, and the like.

With regard to FIGS. 1 and 2, the invention provides a canvas 12 comprised of a "wire frame," that is, a rectangular boundary defined by narrow lines. The width of the lines is as small as practical to demarcate the perimeter of the canvas, and may be as small as one pixel wide. It is significant that no scroll tracks or the like are provided at the side or bottom edges of the canvas, so that no display space is obscured by such objects. The canvas 12 may display a text block 11; if the text block is bigger than the canvas, a portion of the text block 11 is displayed in the canvas, and it is necessary to scroll the canvas to view the other portions of the text block document.

To enable scrolling, the invention provides a scrolling control comprised of a fader cap 14 displayed over its respective side (here, the right side) of the canvas 12. The fader cap 14 is constrained to translate along its respective edge of the canvas 12, in the manner of a fader controller. The fader cap 14 may be dragged along its respective side of the canvas to move the document 11 through the canvas in typical scrolling fashion. The position of the fader cap 14 along its side edge is related to a ratio of the position of the portion of the document being displayed, to the total length (or width) of the document. Thus, as shown in FIG. 3, moving the fader cap 14 downwardly from the position shown in FIG. 2 scrolls the display of the text block toward the bottom of the document. The dragging technique may comprise any such technique known in the prior art, such as click-and-drag, touch-and-drag on a touch screen, click-and-scroll using a scrolling mouse, and the like.

The fader cap 14 is comprised of a geometric shape such as a rectangular or square box having a minimal line width and no fill, so that the interior of the cap 14 is transparent. Thus any portion of the document displayed in canvas 12 that is located beneath the interior of cap 14 is visible. Likewise, any onscreen object or item that is located beneath the exterior of cap 14 is also visible. Thus the fader cap 14, like the wire frame canvas 12, obscures the minimal amount of display space on the screen.

The scroll bar invention includes a navigation aid to assist the user in labeling any selected portion of the document that is displayed in the canvas 12. The fader cap 14 includes a line 16 extending medially through the rectangular box perpendicular to the edge of the canvas. The line 16 may be portrayed in a bright color (here, red) in part to draw visual attention to the fader cap 14. The line 16 is designated as a switch; at any position of the cap 14 along its respective side of the canvas 12, the line 16 may be single clicked, double-clicked (or the like), as shown in FIG. 4A, to create a marker bar 17. Alternatively, the system may be set to create a marker bar whenever the fader cap 14 receives a single click therein without being dragged along the edge. As another alternative, shown in FIG. 4D, the fader cap 14 may be clicked and dragged perpendicularly to the edge on which it slides. For example, the cap 14 may be dragged into the canvas 11, or outwardly thereof, as shown in dotted line, to cause a marker bar to be placed at the location of the fader cap from which it was dragged laterally. When the cap 14 is released from its inward or outward excursion, it snaps back to its previous location along the edge of the canvas 11.

The marker bar is a line that indicates the position of the fader cap 14 when a portion of the document being displayed is selected by the user to be denoted. After a marker bar is created by the user, the user may return to that exact place in the document by merely clicking on the marker bar. Alternatively, the user may return to a place demarcated by a marker bar by dragging the fader cap along its canvas edge to the place where the line 16 overlays the marker bar. Any number of marker bars may be created at any number of locations along the side of the canvas, and may be created in any order and at any time the canvas is open. Thus, as shown in FIGS. 4B and 4C, a second marker bar 18 may be created by the user, and subsequent marker bars, as required.

The marker bars may be differentiated by being displayed in respective unique colors. Thus, as shown in FIGS. 4B and 4C, 5, and 6, the marker bar 17 may be blue, the marker bar 18 may be orange, and so on. With regard to FIG. 6, the user may right click (or the like) on any marker bar to evoke an Info Canvas that displays data regarding the respective marker bar. Such data may include, for example, a "Notes" section where the user may label the location and enter data that is meaningful for editing, rewriting, revising, and the like. The data may also include data regarding date of creation and modification, color, assignment, and the like.

All of this date enables the user to fully identify the importance and utility of each marker bar.

With regard to FIG. 5, marker bars of this invention may also be used to select text or, in general, any portion of a document displayed in canvas 12. A user may draw a lasso 19 (or any other closed curved shape that is designated within the line/arrow logic system to convey this transaction) over the scroll side of the canvas 12, the lasso 19 encompassing at least two marker bars. The system determines the two marker bars that are farthest apart within the lasso 19 area, and selects the document portion extending between these two farthest-spaced marker bars. Thereafter the selected text (that is, selected portion, in general) may be operated upon, as by changing the color or size or style or font of the text, for example. The portion may be deselected by clicking anywhere within the canvas 12, and the lasso 19 will likewise disappear.

Figure 6:
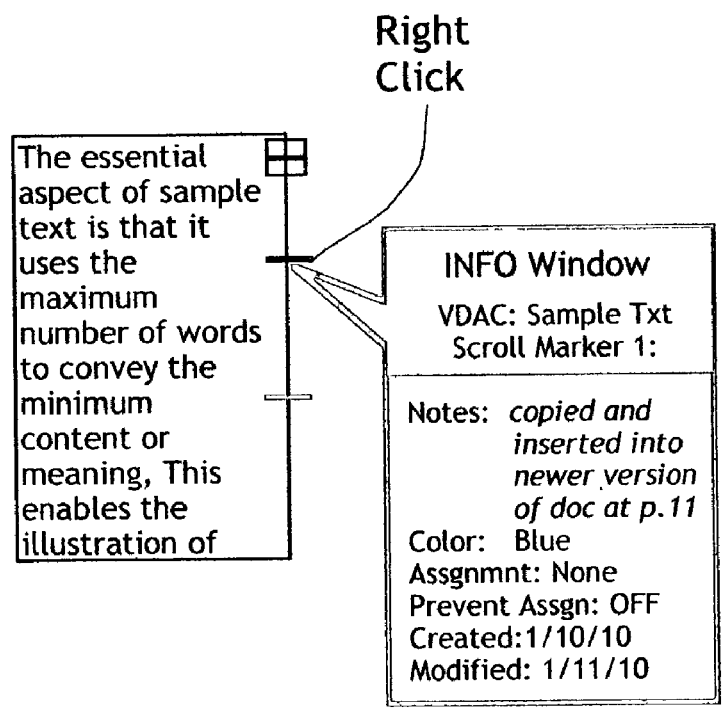
FIG. 6 is a plan view of a marker bar Info Canvas elicited by a right click on any marker bar.

With regard to FIG. 6, each marker bar may have attributes and notes that enhance its value to the user as a marker. The user may place the cursor on a selected marker bar, and right click (or the like) to call forth an Info Canvas for the selected marker bar. The Info Canvas provides detailed data on the marker bar, including name, color, assignment status, and created/modified data. An important feature is a Notes portion that enables the user to notate a marker with whatever information is relevant. Thus the document displayed at any marker bar position may be identified, and the reason for denoting that particular portion of the document may be recorded. This data is important in enabling the user to edit documents and navigate between different sections of text, portions of a picture file, spreadsheet rows and columns, and the like. This feature is a great convenience for editing purposes, particularly for long or large documents.

With regard to FIGS. 8A and 8B, there is illustrated a further feature of the scrolling arrangement of the invention. A user may click on the side of the wire frame 12 to which the fader cap 14 is conjoined. The location of the click, particularly the ratio of the distances between the top and bottom of the wire frame 12, is used to change the display to a portion of the document that is located at substantially the same ratio between the beginning and end of the document (FIG. 8B). This display change takes place substantially instantaneously, so that the display appears to jump to the new location in the document. Thus it is not necessary for a user to scroll through a long segment of a document to arrive at a desired section of the document.

With regard to FIG. 9, the invention may provide page up and page down controls. Using arrow logic techniques described in a previous related patent application U.S. patent application Ser. No. 09/880,397, filed Jun. 12, 2001, a user may designate page up/down controls. For example, the user may write or type "page up" in a space adjacent to the wire frame 12, and draw an arrow from the "page up" text to the top half of the scroller fader cap 14. The arrow head will be illuminated or will flash, and the user may then touch the arrow head with the touch pen or with a cursor click. The "page up" text and the arrow will disappear, and the upper half of the fader cap 14 is thereafter a page up control that is activated by a mouse click or pen tap or the like. Likewise, a page down feature may be created by writing or tying "page down" adjacent to the canvas, and drawing an arrow to the lower half of the fader cap 14.

With regard to FIGS. 7A–7C, the fader cap arrangement of the invention may also be employed along a horizontal side of a wire frame canvas 12. Assuming that a picture or graphic 21 is placed into canvas 12, and that the graphic 21 is larger in width than the canvas 12, the canvas will automatically acquire a scroller fader cap 14' at the lower side of the canvas 12, and a portion of the graphic 21 will be displayed. The fader cap 14' is provided with a medial line or bar 16' extending perpendicularly to the lower side of the canvas 12. As shown in FIG. 7C, the fader cap 14' may be dragged to the right to scroll the display to show the remainder of the graphic 21.

Figure 10A:
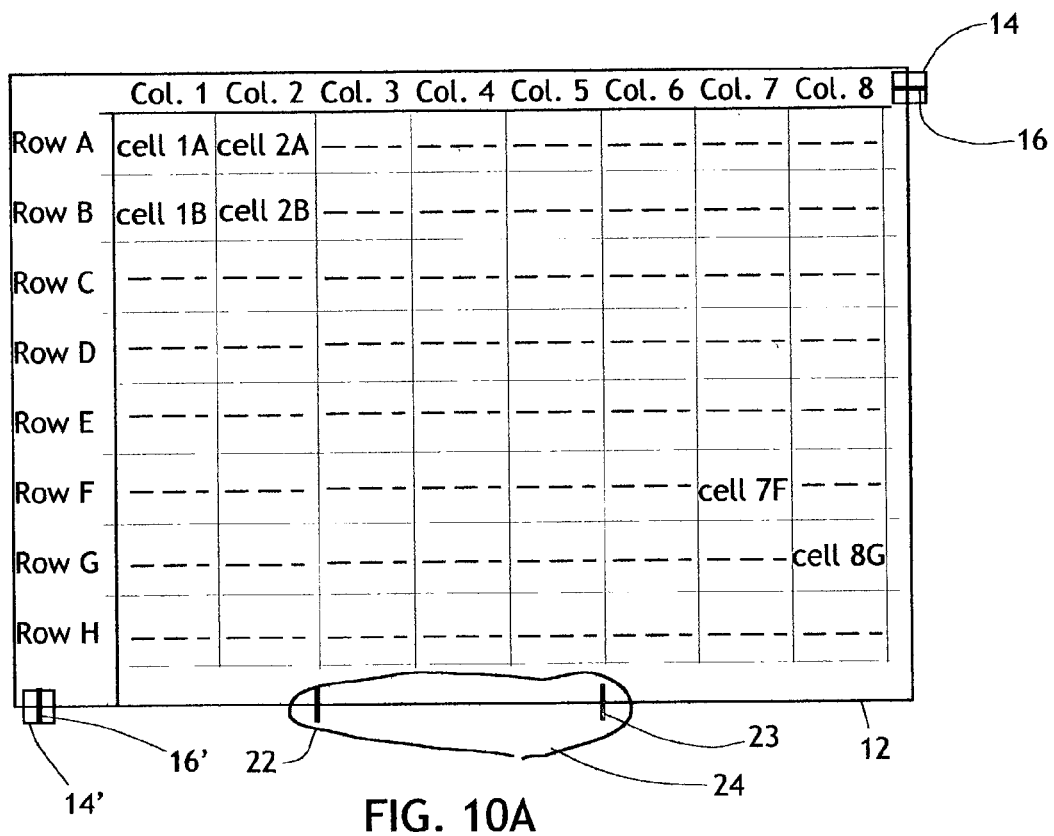
FIGS. 10A–10B depict a spreadsheet portion displayed in a canvas with a scroller cap, and the use of marker bars to select columns of the spreadsheet matrix.
Figure 10B:
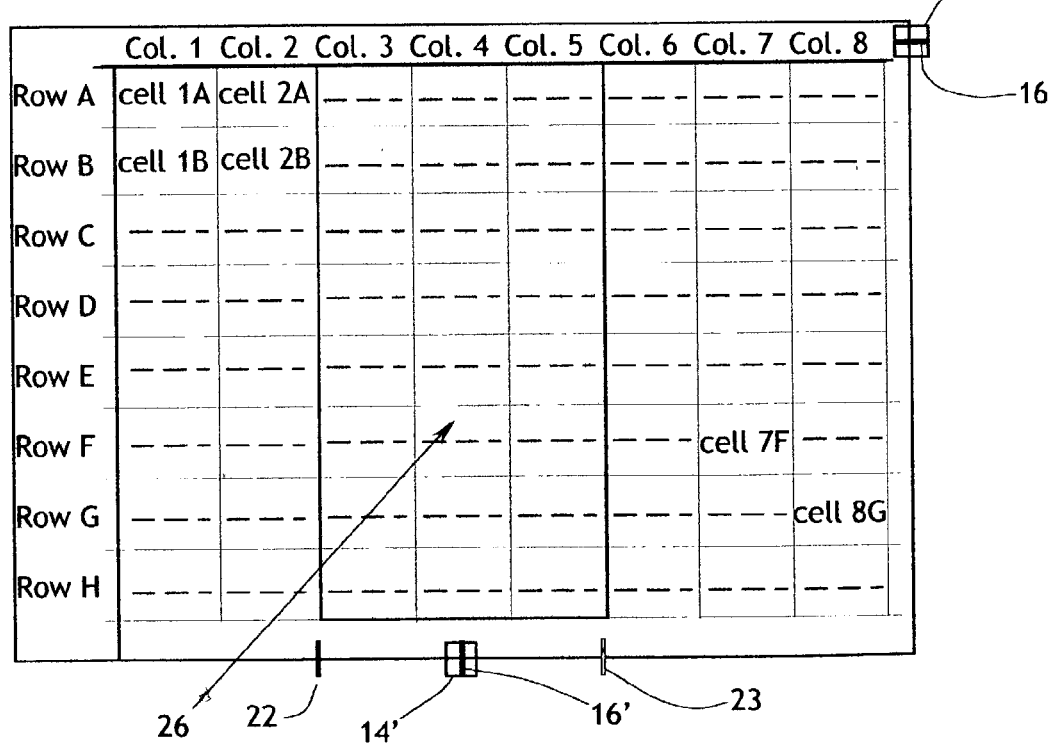

The fader cap 14' and medial line 16' are capable of all the functions described above with regard to fader cap 14 and medial line 16. For example, as shown in FIG. 10A, a spreadsheet may be displayed in the canvas 12. Marker bars may be placed at any point along the horizontal edge of the canvas 12, such as marker bars 22 and 23. Each has a distinctive color, and a single click or tap on any marker bar will move the display to the corresponding point in the lateral extent of the document. Likewise, the Info canvas feature is available for these marker bars. A user may select a portion of the lateral extent of the spreadsheet by drawing a lasso 24 about the marker bars 22 and 23. The display immediately jumps to the selected spreadsheet portion, and highlights the lateral extent (all the columns) 26 between the marker bars 22 and 23, as shown in FIG. 10B. Likewise, horizontally extending rows may be selected using marker bars and a lasso on the vertical edge of the canvas 12, as explained previously. This feature greatly simplifies the otherwise complex editing that may be undertaken within a spreadsheet application.

The fader cap concept of the present invention may be extended to encompass any type, style, size, shape, or color of fader cap known in the prior art of display objects and mechanical fader devices.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiments described are selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A scroll bar device for a canvas of an electronic display, including:
   a frame for defining the boundaries of said canvas;
   a scroller fader cap displayed at one edge of said canvas and constrained to translate along said one edge, said fader cap comprising an enclosed geometric shape;
   said fader cap including a medial line extending therethrough and disposed in intersecting fashion to said one edge of said canvas;
   marker bar means for placing at least one marker bar along said one edge of said canvas to denote a corresponding portion of a document displayed in said canvas;
   wherein said marker bar means includes means for receiving at least one click on said medial line of said fader cap, and means for placing said at least one marker bar at the location of said medial line when it receives said at least one click.

2. A scroll bar device for a canvas of an electronic display, including:
   a frame for defining the boundaries of said canvas;

a scroller fader cap displayed at one edge of said canvas and constrained to translate along said one edge, said fader cap comprising an enclosed geometric shape;

marker bar means for placing at least one marker bar along said one edge of said canvas to denote corresponding portions of a document displayed in said canvas;

wherein said marker bar means includes means for receiving at least one click on said fader cap, and means for placing said at least one marker bar at the location of said fader cap when it receives said at least one click.

3. A scroll bar device for a canvas of an electronic display, including:

a frame for defining the boundaries of said canvas;

a scroller fader cap displayed at one edge of said canvas and constrained to translate along said one edge, said fader cap comprising an enclosed geometric shape;

marker bar means for placing at least one marker bar along said one edge of said canvas to denote corresponding portions of a document displayed in said canvas;

wherein said marker bar means includes means for dragging said fader cap generally perpendicularly to said one edge, and means for placing a marker bar at the location along said one edge from which said fader cap was dragged.

4. A scroll bar device for a canvas of an electronic display, including:

a frame for defining the boundaries of said canvas;

a scroller fader cap displayed at one edge of said canvas and constrained to translate along said one edge, said fader cap including a medial line extending therethrough, said medial line comprising a switch activated by mouse click;

marker bar means for placing at least one marker bar along said one edge of said canvas to denote corresponding portions of a document displayed in said canvas;

wherein said marker bar means includes means for receiving at least one click on said medial line of said fader cap, and means for placing said at least one marker bar at the location of said medial line when it receives said at least one click.

* * * * *